(12) United States Patent
Bokelman

(10) Patent No.: US 6,241,236 B1
(45) Date of Patent: Jun. 5, 2001

(54) AUTOMATED SHEET DELIVERY TO SELECTED PATHS USING REVERSIBLE CRENELLATED ROLLER

(75) Inventor: Kevin Bokelman, La Jolla, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/452,832

(22) Filed: Dec. 1, 1999

(51) Int. Cl.[7] ........................................ B65H 5/22
(52) U.S. Cl. ..................... 271/3.01; 271/65; 271/186
(58) Field of Search ................. 271/3.01, 3.03, 271/3.08, 301, 302, 65, 186

(56) References Cited

U.S. PATENT DOCUMENTS

| | | |
|---|---|---|
| 4,553,828 * | 11/1985 | Burger et al. .................. 271/65 X |
| 4,660,963 | 4/1987 | Stemmle . |
| 4,883,266 | 11/1989 | Fujii . |
| 4,884,097 * | 11/1989 | Giannetti et al. ............. 271/186 X |
| 5,016,061 | 5/1991 | Tashiro et al. . |
| 5,131,649 | 7/1992 | Martin et al. . |
| 5,201,517 | 4/1993 | Stemmle . |
| 5,215,298 | 6/1993 | Stemmle et al. . |
| 5,430,536 | 7/1995 | Fullerton et al. . |
| 5,784,680 | 7/1998 | Taruki . |
| 5,887,865 * | 3/1999 | Ishimaru ....................... 271/186 X |

FOREIGN PATENT DOCUMENTS

485269 * 3/1992 (JP) ...................................... 271/65

* cited by examiner

*Primary Examiner*—David H. Bollinger

(57) ABSTRACT

A method and apparatus of processing sheet media such as document sheets to be duplex scanned or media sheets on which two sided printing is to take place involves the controlled rotation of a transport roller assembly positioned in the media path in different directions such that moving media sheets engage a crenellated surface of the transport roller assembly which moves the leading edge of the moving sheet toward one or the other of two nips defined between the transport roller assembly and associated upper and lower pinch rollers or guides. The crenellated surface of the transport roller assembly includes grooves or spaces which extend in the direction of the leading edge of the sheet so that the leading edge of the sheet enters a moving groove to thus move the leading edge of the sheet in the desired direction. The direction of rotation of the transport roller assembly can be reversed before the sheet leaves the nip to thus re-route the sheet back in a desired path for further sheet processing.

20 Claims, 4 Drawing Sheets

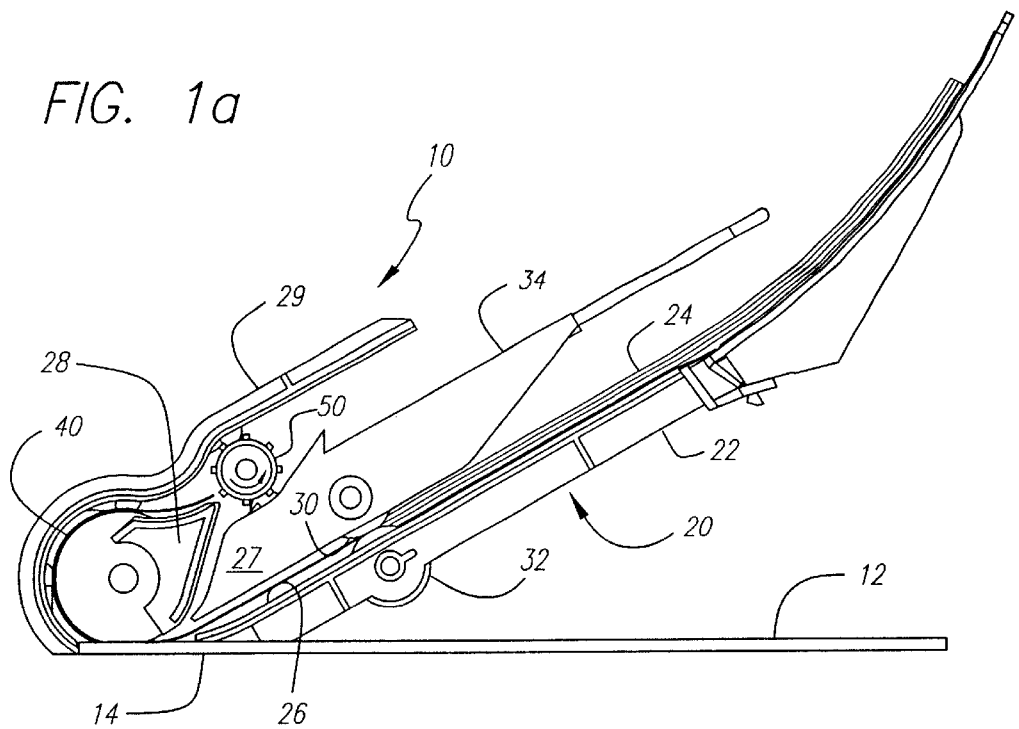
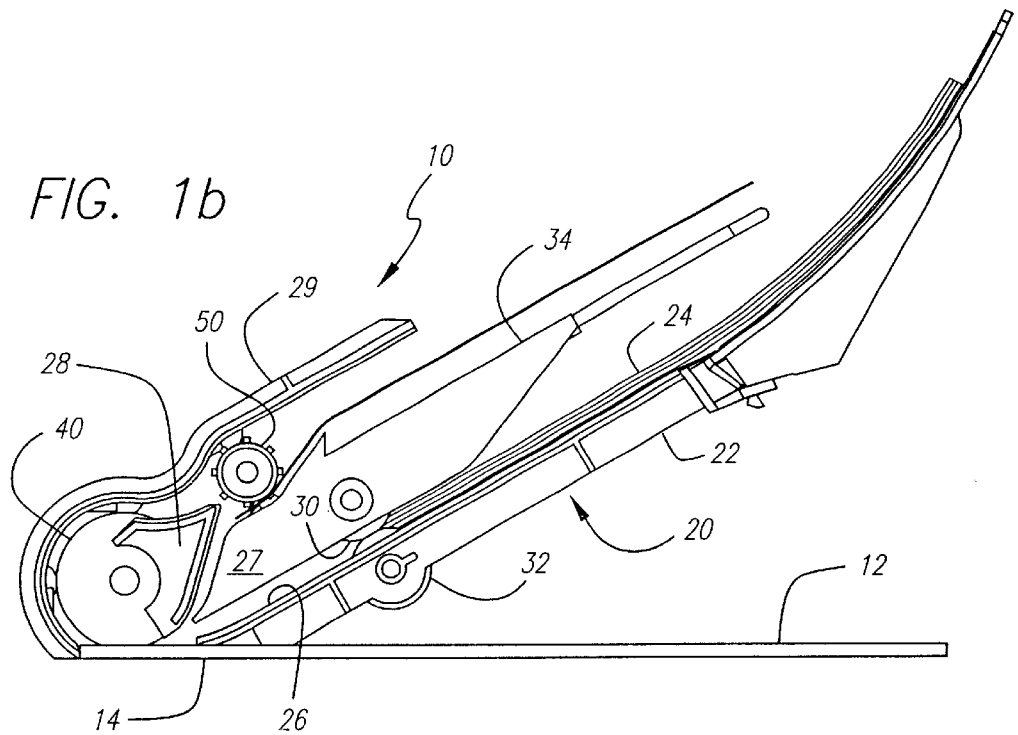

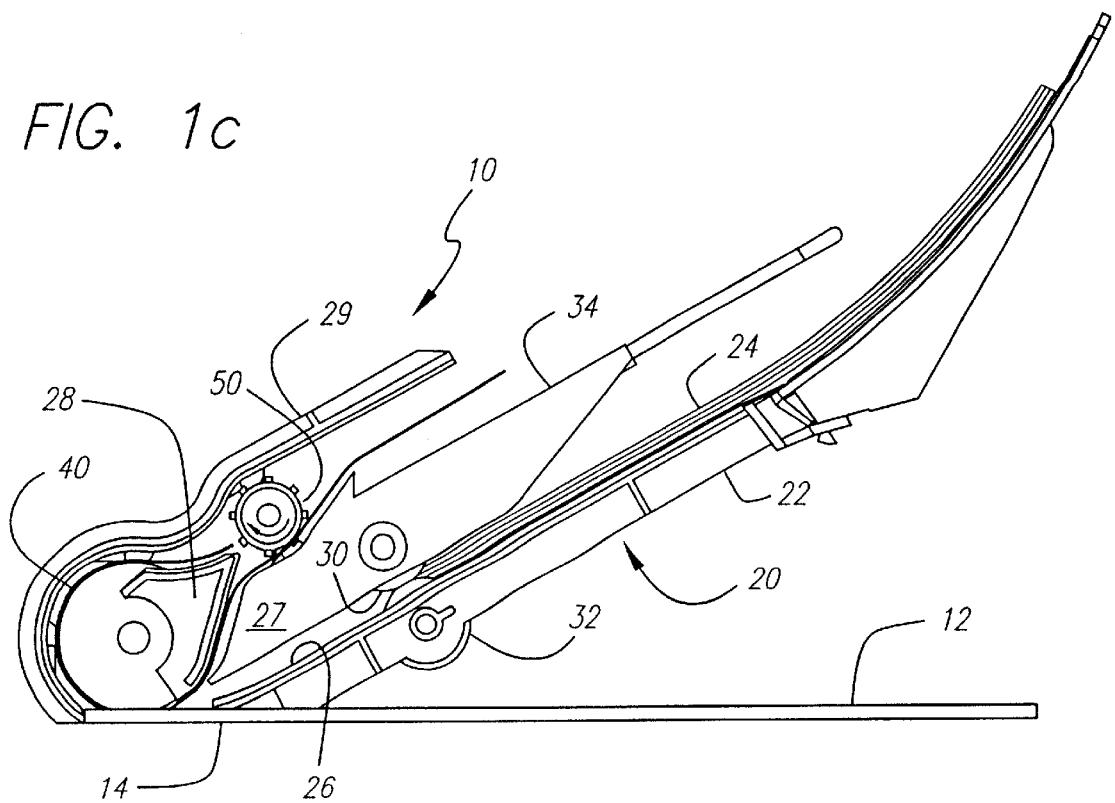
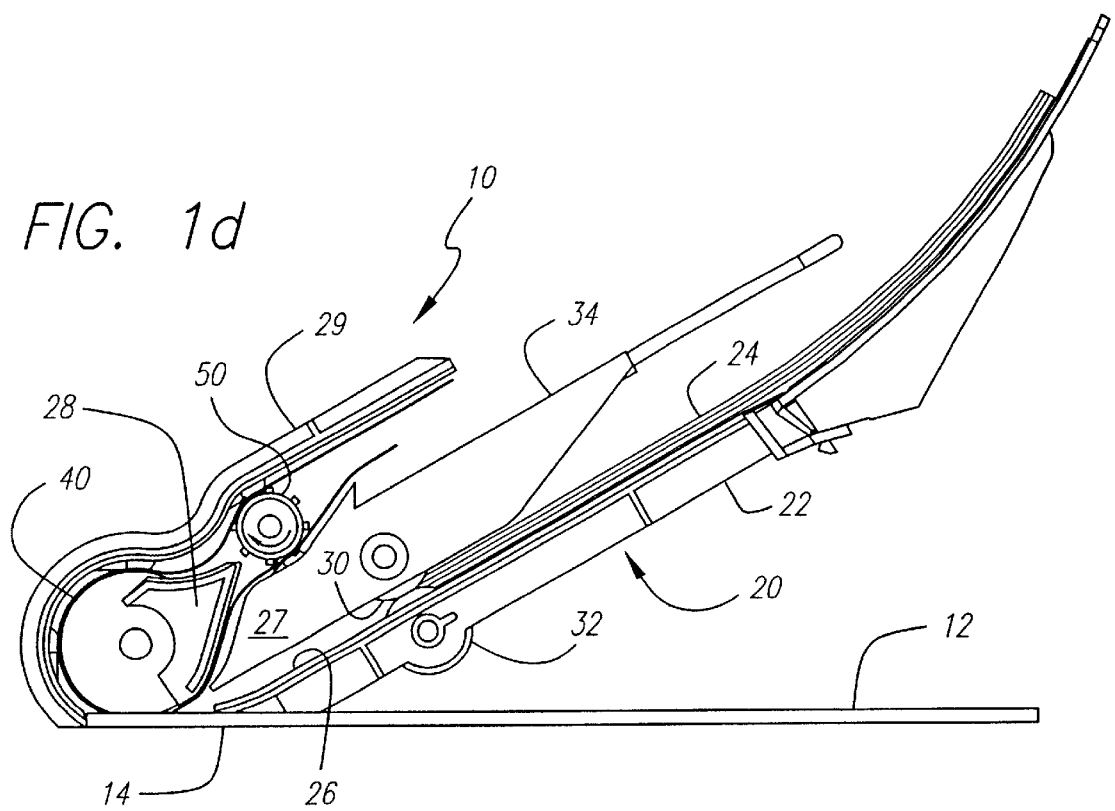

AUTOMATED SHEET DELIVERY TO SELECTED PATHS USING REVERSIBLE CRENELLATED ROLLER

CROSS REFERENCE TO RELATED APPLICATIONS, IF ANY

None

BACKGROUND OF THE INVENTION AND PRIOR ART

The present invention relates to the transport of individual cut sheets of flat flexible media such as paper, vellum, transparencies or the like through a transport path which may have various branches for the delivery of sheets such as printed sheets of media from an input location to a desired location. For the purposes of illustration but not limitation, the invention will be described in the context of a document scanning apparatus having a sheet transport path which extends from a stack of document sheets to be scanned to and through a scanning location to a scanned document location where the scanned sheets are stacked. More particularly, the invention is concerned with the guiding and movement of sheets in a scanning apparatus or printer capable of duplex scanning or printing wherein one side of a media sheet is first scanned or printed and then, if desired, the individual sheets may then be turned over and routed back to the scanning or printing region for scanning or printing the other side of the sheet. The teachings of the invention are applicable generally to any office or business machine in which flexible media sheets must be moved to selected paths.

As used herein, the term "sheet processing apparatus" is therefore intended to broadly include, but not necessarily be limited to, printers, stand alone document copiers, facsimile machines, document scanning machines and combinations of such units.

SUMMARY OF THE INVENTION

The present invention provides a method of processing sheet media in a sheet processing apparatus comprising the steps of:

a) moving individual media sheets from a first location to a processing location of said sheet processing apparatus;

b) processing a first face side of a media sheet at said processing location;

c) moving said sheet from said processing location to cause a leading edge of said sheet to engage a moving generally radially extending surface of a sheet transport roller assembly;

d) rotating said transport roller assembly in a selected direction to cause said surface to move said leading edge as it moves from said processing location into one of two nips defining sheet delivery paths extending between said transport roller assembly and first and second sheet guides;

d) gripping opposite face sides of said sheet in said selected one of said nips and rotating said transport roller assembly in a direction to pull said sheet between said roller assembly and the associated guide to move said sheet away from said processing location toward a processed sheet location.

In apparatus terms, the present invention comprises a sheet media processing apparatus including a sheet media input location, a sheet media processing location, a processed sheet media location and sheet guides defining a media transport path extending from said input location through said processing location to said processed sheet location, sheet transport means for moving individual media sheets along said path, said media transport path including a sheet routing space between a sheet input path and first and second sheet output paths, said sheet transport means including a rotatably driven sheet transport roller assembly in said routing space having a peripheral sheet guide surface arranged and configured to engage a leading edge of said sheet and move said leading edge to one or the other of said output paths, and a power drive for rotating said transport roller assembly in opposite directions to move said leading edge of said sheet into a selected output path and toward said output location.

BRIEF DESCRIPTION OF THE DRAWINGS

FIGS. 1a–1d are side elevation views sequentially showing the progress of a media sheet through a document scanning apparatus which incorporates the teachings of the present invention.

DESCRIPTION OF THE PREFERRED EMBODIMENT

Figure 2:
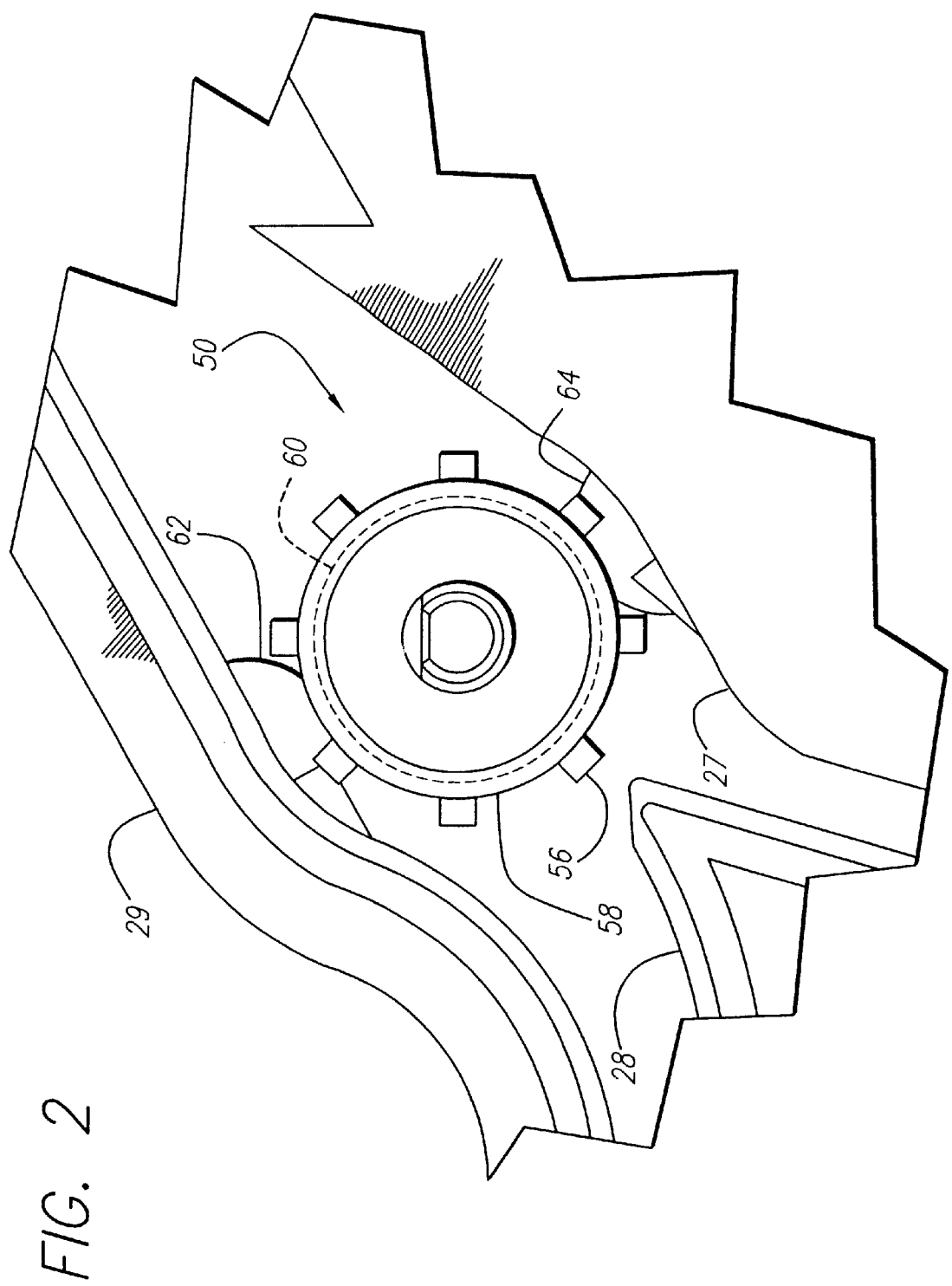
FIG. 2 is an enlarged side elevation view of a media sheet routing space and a reversible transport roller assembly.

FIGS. 1a–1d are identical schematic side elevation views of a document scanning apparatus 10 showing the passage of an individual document sheet therethrough. The apparatus 10 includes a generally flat horizontally extending glass table or platen surface 12 for single sheet scanning and a region 14 at one end thereof through which a moving document to be scanned can be viewed by the scanning components of the device as is conventional. An inclined frame 20 supports a document input or feed tray 22 for holding a stack 24 of documents to be fed to the scanning components. An inclined surface or guide 26 on the frame 20 and a plurality of stationary media sheet guides 27, 28, 29 on the frame together define a sheet media path extending from the media stack 24 to the scan region 14 and thence past a scanning roller 40 and document output sheet transport roller assembly 50 to a scanned document output location at which a tray 34 is provided for receiving a stack of scanned documents. The apparatus for feeding individual sheets from the stack 24 to the scan region 14 includes the inclined media support or feed tray 22, upper and lower media pick rollers 30, 32 and a suitable drive mechanism for moving the rollers 30, 32 in the same forward direction of rotation (e.g., clockwise) for uppermost sheet picking and in the same reverse direction (e.g., counterclockwise) for lowermost sheet picking as described in commonly owned co-pending application Ser. No. 09/405,991 (HP Docket 10991829-1).

Figure 3:
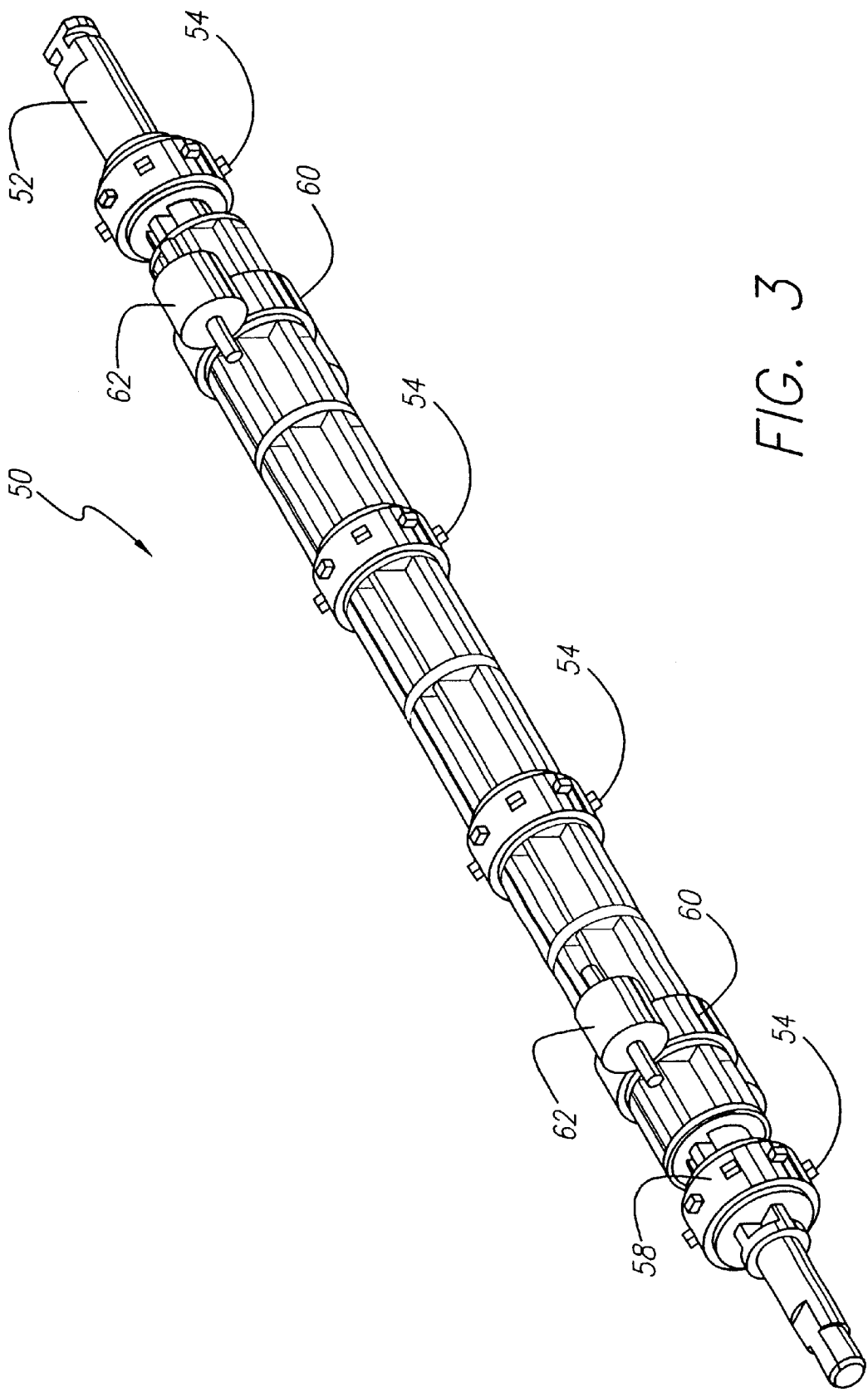
FIG. 3 is a perspective view of the transport roller assembly comprised of a series of spaced coaxially arranged crenellated rollers and drive rollers used in the scanning device of FIG. 1.

FIGS. 2 and 3 respectively show an end elevation and perspective view of a transport roller assembly 50 comprised of a rotatable shaft 52 having a plurality of rollers 54 affixed thereto at axially spaced locations along the shaft 52. Each of the rollers 54 is preferably identical to the other rollers 54 and has a crenellated surface comprised of a cylindrical surface on which generally radially extending projections 56 are formed. The projections 56 are preferably equally circumferentially spaced and thus define axially extending spaces or grooves 58 between the projections 56. Each of the crenellated rollers 54 is mounted on the shaft 52 for rotation with the shaft 52 and with longitudinal alignment of the projections so that the grooves 58 between the projections also align with each other along the length of the shaft 52.

As used herein, the term "crenellated surface" means any suitably roughened surface on a roller or belt wrapped around a roller which defines generally axially extending grooves thereon of width and depth suitable for engaging and moving the leading edge of a sheet of paper or other material engaged in a groove in the direction of rotation of the roller. The grooves may be defined for example by axially extending spaced continuous ridges on the roller or belt surface or by axially extending rows of spaced dimple projections on the roller or belt surface or by grooves cut into the cylindrical roller surface or belt. The term "roller" is intended to include a single elongated roller and the mechanical equivalent of two or more axially spaced rollers on a common shaft or axis.

As seen in FIG. 3, two spaced drive rollers 60 are also mounted on the shaft at spaced locations for engaging a sheet of paper or other media inwardly of the marginal edges of the sheet. Although two drive rollers 60 are shown in FIG. 3, a single one or more than two drive rollers can be used depending on the width of the sheets of media to be handled by the sheet processing apparatus therefore the number of drive rollers 60 is not critical. The transport roller assembly may preferably also include a plurality of elongated ribs 70 and circumferential rings 72 to provide support as necessary to the media sheet.

As seen in FIG. 2, pinch rollers 62 and 64 respectively positioned above and below the transport roller assembly 50 tangentially engage the drive rollers 60 to provide nips and media sheet delivery paths above and below the transport roller assembly 50. The upper pinch rollers 62 are shown in the perspective view of FIG. 3 but the lower rollers 64 are seen only in FIG. 3. It will be understood that lower pinch rollers 64 are provided in engagement with each of the drive rollers 60. Preferably, the pinch rollers 62, 64 are spaced on diametrically opposite sides of the transport roller assembly 50 although it is not essential to do so. It will be noted also that the diameter of the drive rollers 60 is preferably slightly less than the diameter of the crenellated rollers 54. A suitable power drive, not shown, is provided for rotating the transport roller assembly including the crenellated surface rollers 54 and drive rollers 60 in either the clockwise or the counterclockwise direction as desired.

In the arrangement shown in FIG. 3, the cylindrical surfaces of the crenellated rollers 54 need not be specially designed for transversely engaging the face of a sheet of media since the drive rollers 60 are primarily used for transporting the sheet of media through nips defined between the drive rollers 60 and the opposed pinch rollers 62, 64. Accordingly, the drive rollers 60 and pinch rollers 62, 64 will be provided with traction surfaces for gripping and transporting media sheets through the nips as is conventional. In the arrangement shown, the pinch rollers 62, 64 are spring biased into engagement with the drive rollers 60 and comprise idlers which are only rotatable when the transport roller assembly 50 and drive rollers 60 thereon are rotated.

The spaced rollers 54, 60 need not be identical since some rollers 54 on a common axis may have a crenellated surface while other rollers 60 may comprise sheet drive rollers having a friction surface, not necessarily crenellated, suitable for engagement with the pinch rollers 62, 64 to define a nip through which media sheets may be driven. It is contemplated that the crenellated rollers may, if desired, have pinch rollers in engagement therewith whereby the crenellated rollers both guide the leading edge of a media sheet toward a nip and then move the sheet through the nips between the crenellated rollers and associated pinch rollers.

Opposed rollers in surface contact define media sheet transport nips therebetween as is well known therefore the term "roller" is intended and specifically defined to include mechanical substitutes having opposed surfaces which define nips such as opposed continuous belts trained around rollers or an opposed roller and belt which together define a nip.

FIG. 1a shows the initial movement of a sheet of paper or other media from the top or bottom of the stack 24 by the opposed pick rollers 30, 32. In the position shown in FIG. 1a, the leading edge of the paper has progressed and has been driven by the document drive roller 40 through the sheet processing location 14, the leading edge of the sheet having reached a location in the sheet transport path defined between the stationary guides 28, 29. As the leading edge of the sheet, moved by the document drive roller 40 approaches the transport roller assembly 50, a timing circuit actuates the power drive to cause rotation of the transport roller assembly 50 in the counterclockwise direction as seen in FIG. 1a. Continued movement of the leading edge of the media sheet causes the leading edge to engage the crenellated surface of rollers 54 so that the generally radially extending projections 56 and grooves 58 engage and move the leading edge of the sheet downwardly from the stationary guide 28 to the lower output path between the stationary guide 27 and transport roller assembly such that the leading edge of the sheet engages the nip between the lower pinch rollers 64 and drive rollers 60 to continue to move the sheet to the right below the transport roller assembly 50 thus causing the sheet to move entirely away from the processing location 14 and document drive roller 40 toward the processed sheet location or tray 34 as seen in FIG. 1b.

In FIG. 1c the direction of rotation of the transport roller assembly has been reversed such that the roller assembly 50 now rotates in a clockwise direction before the trailing edge of the sheet has passed the nip between the drive rollers 60 and lower pinch rollers 64. This causes the sheet to move back toward the processing location 14 in face inverted orientation so that the other face side of the document sheet can now be scanned or printed upon. During scanning or printing of the second face side of the sheet, the document drive roller 40 continues to rotate in the clockwise direction thus again moving the sheet through the sheet processing region 40 until the leading edge of the sheet (previously the trailing edge) comes into contact with the crenellated surfaces of rollers 54 whereby the projections 56 and grooves 58 engage the leading edge of the sheet and lift and thus guide it toward the upper nip defined between the drive rollers 60 and upper pinch rollers 62 so that the document sheet, now having been duplex scanned or printed, may be passed over the transport roller assembly 50 through the upper nip between the drive rollers 60 and upper pinch rollers 62.

In its broadest aspects, the invention involves the use of a rollers or belts 54 having a crenellated surface to engage the leading edge of a moving media sheet to transport it to one of two output paths such, in the arrangement shown, are above and below the transport roller assembly 50. There is of course no reason that these teachings need be limited to a horizontally oriented transport roller assembly 50 since the principles of the invention will clearly be applicable to the handling of sheet media moving with its flat surfaces in a non-horizontal path provided that appropriate minor modifications are made. In the preferred embodiment shown, separate drive rollers 60 and associated pinch rollers 62, 64 transport the sheet past the transport roller assembly 50 on the selected upper or lower side depending upon the direction of rotation of the transport roller assembly 50. Instead of engaging the drive rollers 60 with pinch rollers, it is contemplated that, for certain media and purposes, separate drive rollers can be dispensed with altogether in which instance the pinch rollers 62, 64 would be aligned with and disposed on preferably diametrically opposite sides of the individual crenellated surface rollers 54. Further, it is contemplated that pinch rollers 62, 64 may not be essential in all instances. The generally radially extending projections 56 on the crenellated surface rollers can be sized and configured as necessary for slidably engaging the stationary guides 27, 29 to define nips between the projections and stationary guides through which the media sheets may pass depending upon the direction of rotation of the transport roller assembly 50. In this instance, the stationary guides themselves, while primarily being stationary, may have resiliently biased portions tangent to the projections 56 to pinch the moving sheet media therebetween. It will be understood that the resilient biasing results in slight movement of the guides 27, 29 which are essentially otherwise considered stationary guides. A single crenellated surface roller 54 having continuous grooves 58 which extend from side to side of the media path can be construed to fulfill such a function.

Persons skilled in the art will appreciate that the transport roller assembly 50 can be molded or otherwise fabricated of plastics or other light weight materials and that the projections 56 and grooves 58 can be integrally formed in the mold of suitable size to perform their intended function of guiding the leading edge of the paper to the desired nip on opposite sides of the transport roller assembly. The details of a suitable drive arrangement for rotating the roller assembly 50 in the desired directions of rotation at the desired time is well within the skill of persons skilled in the art and is therefore not described herein.

Persons skilled in the art will appreciate that various additional modifications can be made in the preferred embodiment shown and described above and that the scope of protection is limited only by the wording of the claims which follow.

What is claimed is:

1. A method of processing sheet media in a sheet processing apparatus comprising the steps of:
   a) moving individual media sheets from a first location to a processing location of said sheet processing apparatus;
   b) processing a first face side of a media sheet at said processing location;
   c) moving said sheet from said processing location to cause a leading edge of said sheet to engage a moving generally radially extending surface of a sheet transport roller assembly;
   d) rotating said transport roller assembly in a selected direction to cause said generally radially extending surface to engage said leading edge as it moves from said processing location to direct said leading edge into one of two nips defining sheet delivery paths extending between said transport roller assembly and first and second sheet guides;
   d) gripping opposite face sides of said sheet in said selected one of said nips and rotating said transport roller assembly in a direction to pull said sheet between said roller assembly and the associated guide to move said sheet away from said processing location toward a processed sheet location.

2. The method of claim 1, including causing said leading edge of said sheet to engage an axially extending groove on a peripheral surface of said roller assembly.

3. The method of claim 2, including causing said leading edge of said sheet to engage spaced axially aligned grooved rollers in said assembly each having at least one said groove whereby said leading edge is moved by said grooves toward said one of said two nips.

4. The method of claim 1, further comprising:
   e) reversing the direction of rotation of said transport roller assembly before a trailing edge of said sheet passes through said selected nip to feed said sheet back to said processing location in face inverted orientation for processing a second face side of said document sheet;
   f) processing said second face side of said sheet at said processing location and moving said sheet from said processing location to cause a leading edge of said sheet to engage said surface of said sheet transport roller assembly;
   g) rotating said transport roller assembly in a selected direction to cause said surface to move said leading edge of said sheet as it is moved from said processing location toward the other one of said nips;
   h) gripping opposite face sides of said moving sheet in said other one of said nips and rotating said transport roller assembly to pull said sheet between said roller assembly and the associated guide to move said sheet from said processing location to said processed sheet location.

5. The method of claim 1, further comprising moving said sheet in engagement with said transport roller assembly in vertically spaced output paths over and under said transport roller assembly by using vertically spaced pinch rollers engaged with said transport roller assembly to comprise said nips.

6. A sheet media processing apparatus including a sheet media input location, a sheet media processing location, a processed sheet media location and sheet guides defining a media transport path extending from said input location through said processing location to said processed sheet location, sheet transport means for moving individual media sheets along said path, said media transport path including a sheet routing space between a sheet input path and first and second sheet output paths, said sheet transport means including a rotatably driven sheet transport roller assembly in said routing space, said sheet transport roller assembly being rotatable around an axis and having a sheet guide surface extending outwardly from said axis, said sheet guide surface being arranged and configured to engage a leading edge of said sheet and move said leading edge to one or the other of said output paths, and a power drive for rotating said transport roller assembly in opposite directions to move said leading edge of said sheet into a selected output path and toward said output location.

7. The sheet processing apparatus of claim 6, wherein said sheet guide surface of said transport roller assembly is crenellated with axially extending grooves thereon.

8. The sheet processing apparatus of claim 7, wherein said transport roller assembly comprises a series of axially spaced sheet guide rollers having axially aligned said grooves thereon for engaging a leading edge of a media sheet at spaced locations.

9. The sheet processing apparatus of claim 8, wherein said transport roller assembly further comprises at least one sheet drive roller axially aligned with said rollers having said grooves and a pinch roller in surface engagement with said drive roller to define a nip for receiving a leading edge of a media sheet and for moving said leading edge in a first one of said output paths.

10. The sheet processing apparatus of claim 9, further comprising at least two of said drive rollers and pinch rollers engaged therewith at spaced locations along said transport roller assembly defining axially aligned nips for receiving a leading edge of a media sheet and directing said leading edge to a first one of said output paths.

11. The sheet processing apparatus of claim 9, wherein said transport roller assembly further comprises a second pinch roller in surface engagement with said drive roller to define a second nip for receiving a leading edge of a media sheet and for moving said leading edge in a second one of said output paths.

12. The sheet processing apparatus of claim 10, wherein said transport roller assembly further comprises a second pinch roller in surface engagement with said drive roller to define a second nip for receiving a leading edge of a media sheet and for moving said leading edge in a second one of said output paths.

13. The sheet processing apparatus of claim 12, further comprising at least two of said drive rollers and second pinch rollers engaged therewith at spaced locations along said transport roller assembly defining axially aligned second nips for receiving a leading edge of a media sheet and for moving said leading edge in a second one of said output paths.

14. The sheet processing apparatus of claim 13, wherein said crenellated rollers move said leading edges of said sheets toward said nips above and below said transport roller assembly and said drive rollers move said sheets in vertically spaced output paths toward said output location.

15. The sheet processing apparatus of claim 14, further comprising stationary guides proximate said pinch rollers for guiding a leading edge of a media sheet to said nips.

16. The sheet processing apparatus of claim 15, wherein said pinch rollers are biased into engagement with said drive rollers.

17. The sheet processing apparatus of claim 16, further comprising a scanning apparatus at said processing location to scan said sheet.

18. The sheet processing apparatus of claim 17, wherein said sheet transport means comprises a sheet feeder at said input location for feeding individual media sheets from a stack into said transport path.

19. The sheet processing apparatus of claim 16, further comprising a printing apparatus at said processing location to print on said sheet.

20. The sheet processing apparatus of claim 19, wherein said sheet transport means comprises a sheet feeder at said input location for feeding individual media sheets from a stack into said transport path.

* * * * *